United States Patent [19]
Wagner

[11] 3,758,869
[45] Sept. 11, 1973

[54] TRANSFORMER COUPLED POWER SWITCH DEMODULATOR

[75] Inventor: Ronald M. Wagner, Greendale, Wis.

[73] Assignee: General Motors Corporation, Detroit, Mich.

[22] Filed: Apr. 24, 1972

[21] Appl. No.: 246,973

[52] U.S. Cl.............. 329/102, 307/234, 307/241, 328/168, 329/106, 330/30 D
[51] Int. Cl. ............................................. H03k 9/08
[58] Field of Search................. 330/30 D; 329/101, 329/102, 103, 106; 328/168; 307/234, 239, 240, 241, 242, 254, 282

[56] References Cited
UNITED STATES PATENTS

| | | | |
|---|---|---|---|
| 2,677,054 | 4/1954 | Cohen | 328/168 X |
| 2,990,516 | 6/1961 | Johannessen | 307/234 X |
| 2,916,729 | 12/1959 | Paull | 307/282 X |
| 3,112,410 | 11/1963 | Schmid | 307/254 X |
| 3,479,530 | 11/1969 | France | 307/241 X |
| 2,994,840 | 8/1961 | Dorsman | 307/282 X |

Primary Examiner—Alfred L. Brody
Attorney—Eugene W. Christen, Albert F. Duke et al.

[57] ABSTRACT

A power switch demodulator comprising a pair of power transistors having their collector electrodes connected together and to a source of DC voltage and their emitter electrodes connected together and to a load. A transformer comprising a primary winding and two secondary windings controls the conduction of the two power transistors to demodulate a pulse width modulated drive signal applied to the primary of the transformer.

3 Claims, 10 Drawing Figures

PATENTED SEP 11 1973 3,758,869
SHEET 1 OF 2
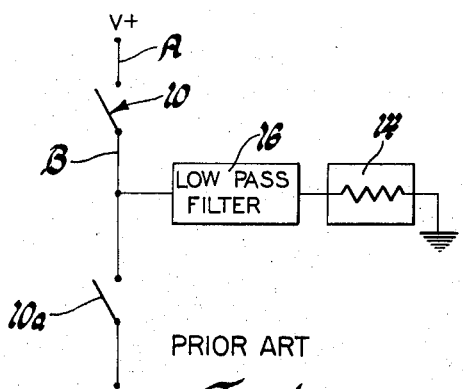
Fig. 1a  PRIOR ART
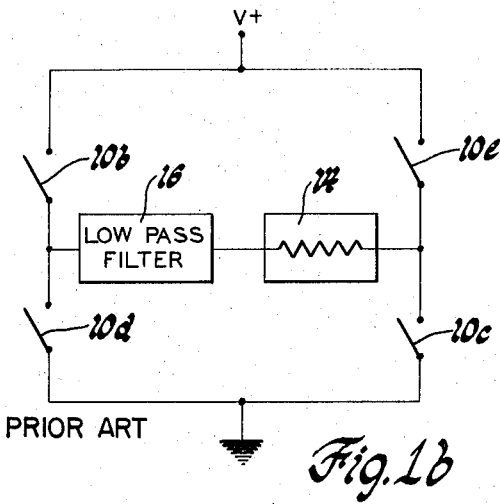
Fig. 1b  PRIOR ART
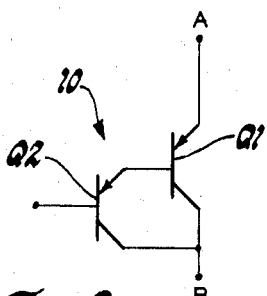
Fig. 2a  PRIOR ART
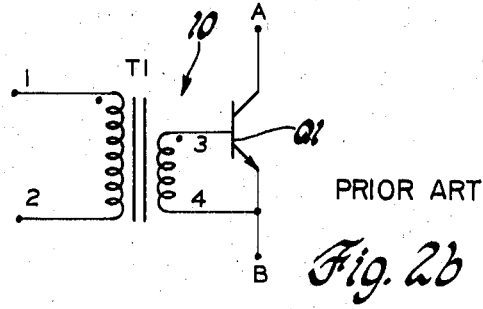
Fig. 2b  PRIOR ART
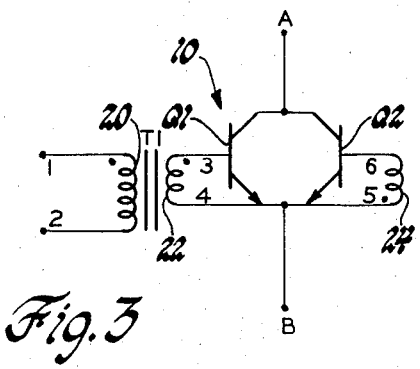
Fig. 3
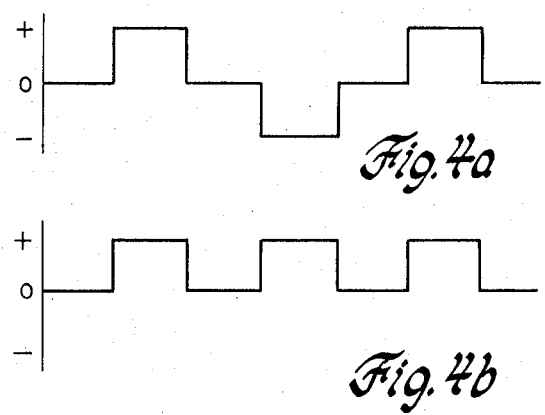
Fig. 4a
Fig. 4b
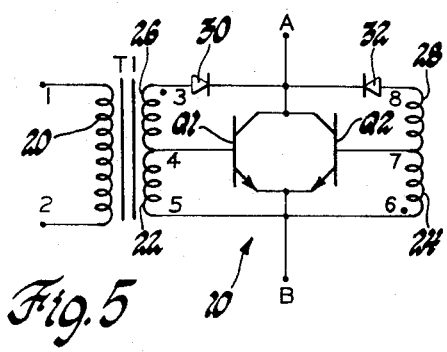
Fig. 5

TRANSFORMER COUPLED POWER SWITCH DEMODULATOR

The invention herein described was made in the course of work under contract or subcontract thereunder with the Department of Defense. This invention relates to a controlled switching of power to a load and more particularly to a transformer coupled switch for power demodulation of return-to-zero pulse width modulated control signals.

Coded, on/off, time proportional signals are often used for the efficient conversion of power from one form, for example, direct current, to another form, for example 400 Hz. A typical code used is pulse width modulation. To perform the switching function power transistors are typically used and operate in a "H" bridge configuration from a unipolar DC power supply or in an "I" bridge configuration from a bipolar DC power supply. Two common methods for handling the drive requirements for the power transistors are the use of the Darlington connection and the use of transformers. The principle disadvantage of the Darlington connection is the relatively slow turn-off time of the transistors. The principle disadvantage of the transformer drive is the fact that it is not capable of controlling DC signals.

It is an object of the present invention to provide a power switch configuration providing maximum switching efficiency and relatively low power losses.

It is another object of the present invention to provide a transformer coupled power switch which performs a demodulation function.

It is another object of the present invention to provide a power demodulator for use in pulse width modulation control systems comprising a drive transformer and a switch configuration which permits sizing of the drive transformer for the carrier frequency rather than the lowest drive frequency.

It is another object of the present invention to provide a power demodulator comprising a drive transformer and a switch consisting of a pair of transistors which are wired "OR" which provides DC isolation while allowing the transistor common emitter input characteristics to be matched to a low level interface unit.

Other objects and advantages of the present invention will be apparent from the following detailed description which should be read in conjunction with the drawings in which:

FIGS. 1a and 1b show typical "I" and "H" bridge configurations for supplying power to a load;

FIGS. 2a and 2b show conventional switching configurations for use in the bridge circuits of FIGS. 1a and 1b;

FIG. 3 is a schematic diagram of the transformer coupled power demodulator of the present invention;

FIGS. 4a and 4b show input and output waveforms respectively applicable to the demodulator of FIG. 3;

FIG. 5 is a schematic diagram of a modification of the power demodulator of the present invention;

Figure 6:
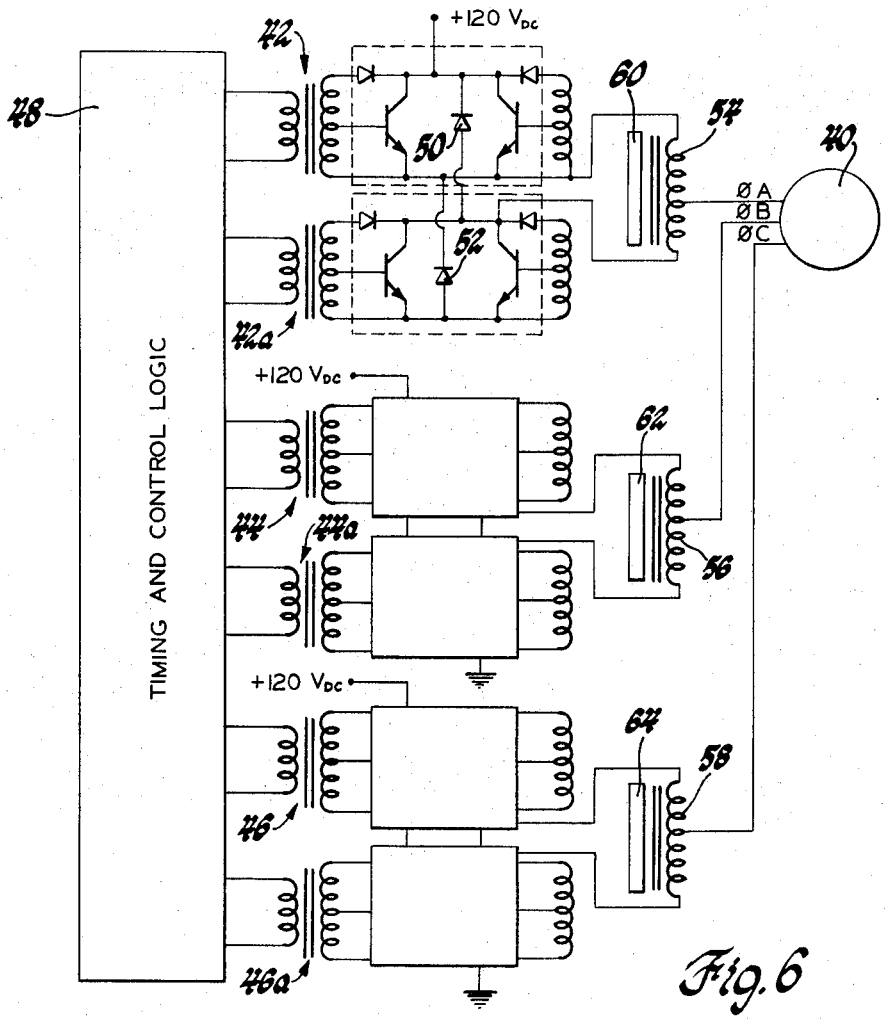
FIG. 6 is a schematic diagram of a three-phase induction motor control system employing the power demodulator of FIG. 5.

Referring now to the drawings and initially to FIG. 1a, a conventional "I" bridge configuration supplied from a bipolar direct current power supply includes a pair of switches 10 and 10a for selectively connecting a resistive load 14 to either V+ or V− through a low pass filter 16. In FIG. 1b a conventional "H" bridge configuration is supplied from a unipolar direct current supply. The load 14 and filter 16 are selectively connected between V+ and ground by simultaneous closure of the switches 10b and 10c, or 10d and 10e. In both FIGS. 1a and 1b an alternating current is supplied to the load 14 by controlling the time of closure of the switches 10 through 10e.

Because of the disadvantages associated with electromechanical switches, namely, mechanical wear and relatively slow speed, transistors are most often used for the switches of FIGS. 1a and 1b. The switch function is performed by the collector-emitter electrodes of the transistor while the drive is supplied to the base-emitter electrodes. To control the transistors output conductance the charge distribution in the base-emitter junction must be altered from one level to another. To obtain low output conductance 0 volts base-emitter (or negative) must be applied at the electrodes and to obtain high conductance approximately 1.5 volts must be supplied to the base-emitter electrodes. In addition, current must be supplied to make up charge lost in the process because the efficiency of the process is imperfect, i.e., the current gain is finite. For most power transistors the base current which must be supplied ranges from 1/20 to 1/10 the collector or output current.

To handle the transistor drive requirements, some sort of match must be made to convert supply level voltages to levels suitable for the transistor. One common method is to use the Darlington connection shown in FIG. 2a which comprises transistors Q1 and Q2. The switching function across the terminals A and B is controlled by the input to the base of transistor Q2. While the switch shown in FIG. 2a provides fast turn-on of the transistors Q1 and Q2, no mechanism is provided for removal of the large amount of excess charge that is stored in the base collector region of a saturated transistor. As a result, with transistors that have a gain-bandwidth product of 10 MHZ, for example, turn off delays on the order of 1 to 5 microseconds are experienced. This delay represents a significant portion of the one-half period "ON" conduction time of a transistor being switched at a 20 KHZ rate.

Another common method of supplying base drive to a transistor switch is shown in FIG. 2b. Control of switch operation between the terminals A and B of the transistor Q1 is supplied by a transformer T1. The drive arrangement of FIG. 2b shows definite improvement in switching times compared with that of FIG. 2a but is not capable of controlling direct current signals. Moreover, to sustain even low frequency output signals of for example, 40 to 400 Hz across A to B, a relatively large transformer T1 is required.

The switch element 10 of the present invention is shown in FIG. 3 and employs two power transistors Q1 and Q2 which are wired "OR" i.e., the collector and emitter electrodes of transistor Q1 are directly connected with the collector and emitter electrodes respectively of the transistor Q2. Drive for the transistors Q1 and Q2 is supplied by a transformer T1 having a primary winding 20 and two secondary windings 22 and 24 respectively interconnecting the base and emitter electrodes of the transistors Q1 and Q2. In contrast to FIG 2b the switch element in FIG. 3 conducts between terminals A and B so long as a signal is applied across the primary winding 20 of the transformer T1. This will be apparent from the fact that as terminal 1 of winding 20 is positive, terminal 3 is also positive and terminal 6 is negative and consequently, Q1 is conductive. Conversely, when terminal 2 is positive, terminal 3 is negative and terminal 6 is positive rendering transistor Q2 conductive. Thus, while the signal applied to the primary 20 of transformer T1 alternates between plus and minus, the output across the terminals A and B of the switch is unidirectional and hence a demodulation function is performed. The percentage time of closure across the terminals A and B may be controlled by varying the duty cycle of the signals applied to terminals 1 and 2 of the transformer T1. For example, if a 20 KHZ alternating signal is applied to terminals 1 and 2 of the transformer T1, switch closure across the terminals A and B will be permanent. Similarly, with a pulse width modulated signal applied to the primary winding 20 having an ON time of 25 percent (+) and 25 percent (−) as shown in FIG. 4a, the switch between the terminals A and B is closed 50 percent of the time as shown in FIG. 4b. Any combination between 0 percent and 100 percent conduction between the terminals A and B may thus be achieved by varying the ON time of the current in the primary winding 20.

The transformer coupled power demodulator of FIG. 3 permits matching of the approximate 1.5 volt $V_{BE}$ of the switching transistor Q1 and Q2 to the input drive source applied across the primary 20; and is used in a current mode of operation to provide a 1:10 or greater current transformation. In addition, the bolt seconds as reflected back through the transformer T1 is balanced plus and minus since the output transistors are alternately turned on and off. Therefore, there is no d-c content through the transformer T1 but the output conductance modulation has a d-c component. Consequently, a demodulation of the carrier occurs in the two transistors Q1 and Q2 directly while achieving the grain of the transistors in the process. It is apparent therefore that the usual demodulation means required in addition to the power switching means has been eliminated by the wired "OR" connection of the transistors Q1 and Q2 while also satisfying the volt-seconds requirement of the transformer T1.

Referring now to FIG. 5, the demodulator of FIG. 3 has been modified by the addition of secondary windings 26 and 28 and clamp diodes 30 and 32 interconnecting the base and collector electrodes of the transistors Q1 and Q2 which hold the collector-base of the transistors out of saturation. The winding 26 and 28 are selected so that the voltage across the windings is equal to $V_{CE}$ of the conductive transistor plus the voltage across the conducting diode 30 or 32. Any current injected into terminals 1 and 2 of the primary winding 20 and transformed by transformer T1, beyond that required to bias transistors Q1 or Q2 to the predetermined $V_{CE}$ will spill into the output conductance of transistors Q1 or Q2 to thereby keep the transistors Q1 and Q2 out of saturation. The unsaturated switching permits faster transistor switching times and therefore improves transistor efficiency.

The power demodulator of FIG. 5 is applicable in almost all types of switching operations. In FIG. 6 the demodulator is applied in computer control of a three-phase induction motor 40 wherein it is desired to provide a variable frequency excitation of, for example, 40 to 400 Hz.

Current from the 120 volt DC source to the three-phase induction motor 40 is controlled by upper and lower switch demodulators generally designated 42 and 42a for phase A, 44 and 44a for phase B, and 46 and 46a for phase C. Timing and control logic generally designated 48 controls the upper and lower switch units 42, 42a; 44, 44a; 46, 46a to provide a three-phase output to the motor 40. Diodes 50 and 52 are provided between each of the upper and lower switch units 42, 42a; 44, 44a; and 46, 46a provide a current path for energy stored in the motor 40 when the switch units are cut off.

Overcurrent detection is readily accomplished in the system of FIG. 6 by transposing inductors 54, 56, and 58 between the upper and lower switch units which sense the current by means of Hall cell magnetic flux sensors 60, 62, and 64 situated in the air gap of the respective inductors. Each half of the inductors 54, 56, and 58 is sized to limit the rate of rise of current to some maximum value that is commensurate with the 120 VDC supply, the minimum increment of pulse width, and the maximum switch capacity of the output transistors. The outputs of the Hall cells may be summed and scaled by an amplifier and switch assembly (not shown) to give a logic signal indicating an overcurrent condition.

Figure 7:
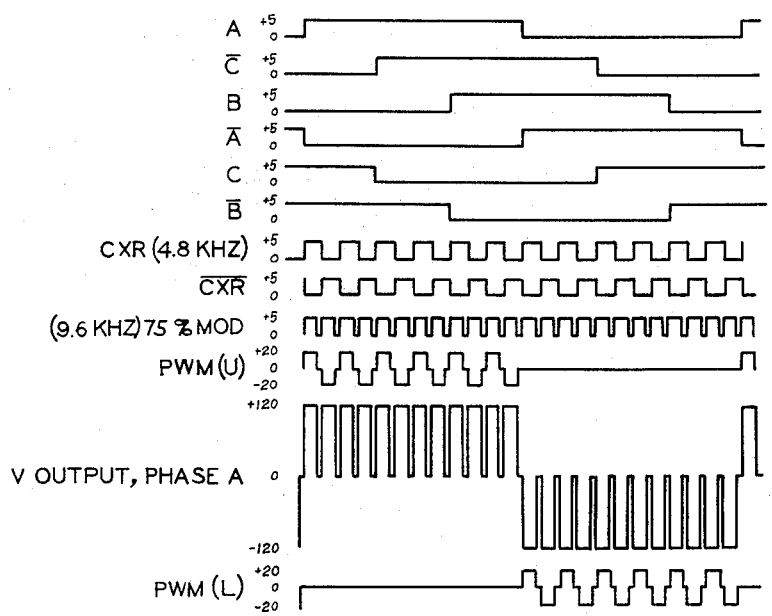
FIG. 7 shows various waveforms associated with the system of FIG. 6.

Referring now to FIG. 7, voltage waveforms associated with the system of FIG. 6 are shown. The upper and lower switch demodulators 42, 42a; 44, 44a; 46 and 46a are operated in a timed sequence from the logic 48 in accordance with the waveform A, $\overline{A}$, B, $\overline{B}$, C, $\overline{C}$ respectively at a low frequency of for example, 40 Hz. to 400 Hz. The 4.8 KHZ carrier signals CXR and $\overline{CXR}$ as well as a 9.6 KHZ modulating signal (shown at 75 percent modulation) are mixed in the logic 48 to produce a pulse width modulated signal designated PWM (U) and PWM (L) which are applied respectively to the drive transformers of the upper and lower demodulator units 42 and 42a to produce the voltage output to phase A as shown in FIG. 7. Similar time displaced waveforms (not shown) are generated for phase B and phase C outputs.

In this application the demodulator allows the low frequency drive signals to cross the transformer T1 at the carrier signal rate. Accordingly, the drive transformer T1 may be sized for the carrier frequency rather than the lowest drive frequency of 40 Hz. This results in a much smaller transformer package which is of great importance in many applications. In addition, the switching characteristic of the output transistors Q1 and Q2 are improved since the transistors are switched at a high frequency relative to the actual power frequency. Large power losses will occur in the transistor if the switch transition times are slow. As compared to a Darlington switch configuration where the turn-off base to emitter resistance will be in the order of 10 to 50 ohms, the transformer coupled switch configuration of the present invention allows the impedance to be limited to approximately 0.1 ohms resistive and 0.25 ohms reactive. For example, the primary of the transformer will be short circuited by the input drive source during turn-off and the impedance at the secondary terminals will be this impedance plus the associated transformed copper and leakage reactance coefficients of the transformer.

Having thus described my invention what I claim is:

1. A power demodulator for controlling the power delivered to a load from a source of direct current in accordance with a return-to-zero pulse width modulated input signal comprising first and second power transistors having their emitter and collector electrodes connected together and in series with said source and said load, a current transformer sized for the carrier frequency of said input signal and having a primary winding for connection with said input signal, and first and second secondary windings connected across the emitter and base electrodes of said first and second power transistors respectively, whereby said first and second power transistors are alternately rendered conductive at the carrier frequency of said input signal and the power delivered to the load is proportional to the degree of modulation of said input signal.

2. A power demodulator comprising a transformer including a primary winding and first and second secondary windings, means for applying a return-to-zero pulse width modulated input signal to said primary winding, said transformer being sized for the carrier frequency of said input signal, first and second power transistors having their respective emitters and collectors connected together, said first secondary windings being connected with the base and emitter electrodes of said first power transistor, said second secondary winding being connected with the base and emitter electrodes of said second power transistor, a direct current source connected with the collector electrodes of said first and second power transistors and a load connected with the emitter electrodes of said first and second power transistors, whereby said first and second transistors are respectively rendered conductive during the positive and negative on-times of said input signal and are nonconductive during the off-time of said input signal.

3. A power demodulator comprising a transformer including a primary winding for connection with a return-to-zero pulse width modulated input signal, said transformer being sized for the carrier frequency of said input signal, first and second power transistors having their respective emitters and collectors connected together, said transformer further including first, second, third, and fourth secondary windings, said first and second secondary windings being respectively connected across the base and emitter electrodes of said first and second power transistors, a first clamp diode connected in series with said third secondary winding across the base and collector electrodes of said first power transistor to prevent saturation of said first power transistor, a second clamp diode connected in series with said fourth secondary windings across the base and collector electrodes of said second power transistor to prevent saturation of said second power transistor, means for connecting a source of direct current to a load through the emitter-collector electrodes of said first and second power transistors, whereby said first and second transistors are respectively rendered conductive during the positive and negative portions of each cycle of said input signal.

* * * * *